United States Patent [19]

McKinney

[11] Patent Number: 5,692,624
[45] Date of Patent: Dec. 2, 1997

[54] MODULAR FRAMING UNIT AND FURNITURE MADE THEREFROM

[76] Inventor: Luther P. McKinney, 4808 Kilkenny Pl., Raleigh, N.C. 27612

[21] Appl. No.: 443,113

[22] Filed: May 17, 1995

[51] Int. Cl.⁶ .................................................. A47B 43/00
[52] U.S. Cl. ........................ 211/189; 211/182; 211/186; 211/187; 108/153
[58] Field of Search .................................... 211/189, 186, 211/187, 181, 148, 126, 182; 108/153, 180, 107; 297/440.1; 248/245, 231.31, 231.21, 230.2, 229.11, 316.2; 267/69, 70, 72; 403/297, 370, 374, 409.1

[56] References Cited

U.S. PATENT DOCUMENTS

| | | | |
|---|---|---|---|
| 239,834 | 4/1881 | Paldi | 403/374 X |
| 759,777 | 5/1904 | Usher | 108/153 |
| 1,437,256 | 11/1922 | Martin | 211/189 |
| 1,801,277 | 4/1931 | Kelley | 403/370 X |
| 2,252,126 | 8/1941 | Kersey | 56/249 |
| 2,253,172 | 8/1941 | Fetterman | 108/153 |
| 2,310,326 | 2/1943 | Swartout | 189/34 |
| 2,554,015 | 5/1951 | Costello | 287/78 |
| 2,613,957 | 10/1952 | Ritter | 108/153 X |
| 2,897,013 | 7/1959 | Delp | 211/189 X |
| 3,121,439 | 2/1964 | Moltchan | 135/7.1 |
| 3,184,075 | 5/1965 | Cohen | 211/148 |
| 3,316,864 | 5/1967 | Maslow | 108/153 X |
| 3,934,519 | 1/1976 | Petit | 108/153 X |
| 4,025,216 | 5/1977 | Hives | 108/153 X |
| 4,057,878 | 11/1977 | Kaye | 403/374 X |
| 4,480,756 | 11/1984 | Belokin, Jr. | 211/126 |
| 4,508,230 | 4/1985 | Ashton | 211/181 |
| 4,528,865 | 7/1985 | Nagano | 403/374 X |
| 4,603,906 | 8/1986 | Mathieson | 297/440 |
| 4,632,344 | 12/1986 | Lang et al. | 211/189 X |
| 5,065,873 | 11/1991 | Tseng | 211/187 |
| 5,127,763 | 7/1992 | Kunoki | 403/374 X |
| 5,152,230 | 10/1992 | Licari | 108/153 |
| 5,351,843 | 10/1994 | Wichman et al. | 211/182 X |
| 5,499,481 | 3/1996 | Targetti | 211/189 X |
| 5,499,883 | 3/1996 | Heinzel | 108/180 X |

FOREIGN PATENT DOCUMENTS

| | | | |
|---|---|---|---|
| 420209 | of 1947 | Italy | 211/189 |
| 1136288 | 12/1968 | United Kingdom | 211/189 |
| 1293212 | 10/1972 | United Kingdom | 267/69 |

*Primary Examiner*—Leslie A. Braun
*Assistant Examiner*—Kimberly Wood
*Attorney, Agent, or Firm*—Olive & Olive, P.A.

[57] ABSTRACT

A modular unit including at least one connector for a plurality of rods. The connector is made of an outer tension band; a compression member fitting within the outer tension band; and from one to three structural rods at the end of each leg of the compression member within the outer tension band. Each compression member contains an offset incline surface between opposing sections, and a hole through the sections for a tightening fastener to be inserted. When force is applied to the fastener to bring the compression member sections together, the incline surface transmits the force at right angles and the compression member expands until the structural rods are tight against the inner wall of the outer tension band. The connector may have 2–4 legs and a cluster of 1–3 structural rods at the end of each leg. A modular framing unit is formed with one or more connectors holding together selected rectangular, U-shaped and other rod portions. One or more similar or different modular framing units are held together with the same or additional connectors.

20 Claims, 11 Drawing Sheets

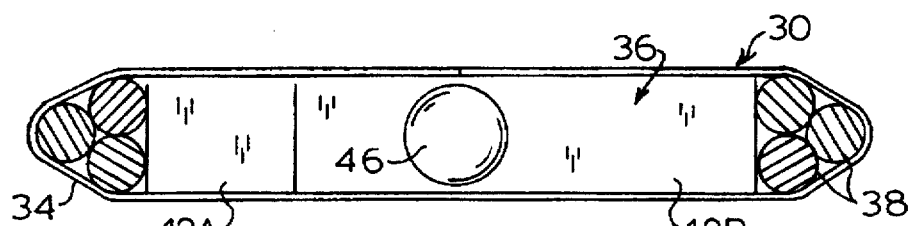
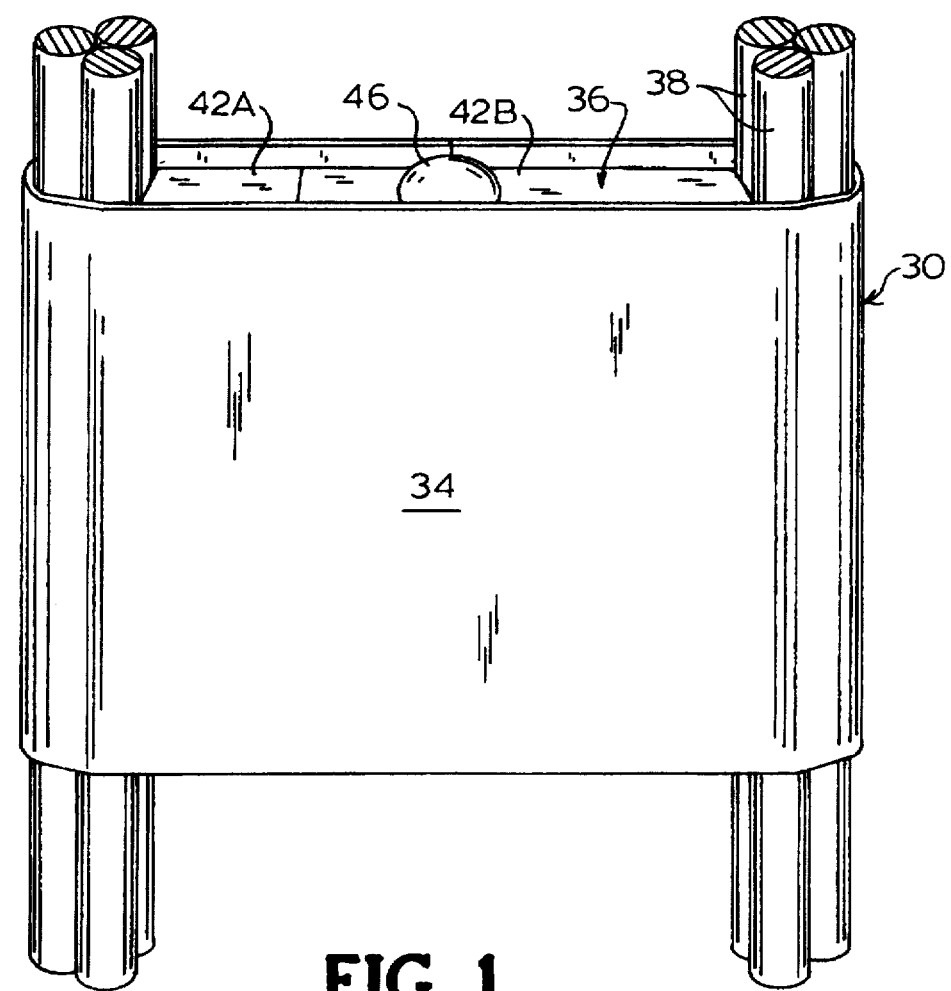
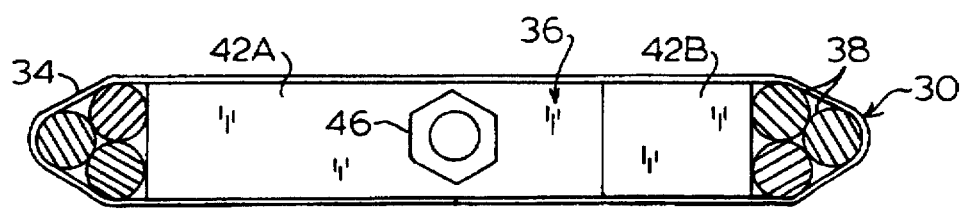

5,692,624

MODULAR FRAMING UNIT AND FURNITURE MADE THEREFROM

BACKGROUND OF THE INVENTION

1. Field of the Invention

This invention relates to modular construction, and in particular relates to a method and unit for making modular furniture.

2. Description of the Related Art

Because most furniture must be made both sturdy enough for its intended use, and decorative enough so that it will be purchased, furniture tends to be heavy, pre-assembled, on-ordered, and expensive to make. Manufacturers of these products have difficulty when producing accessory furniture, and companies specializing in "wrought iron" and "wicker" furniture fill these needs using entirely different materials and methods of manufacturing. Producers of wrought iron and wicker furniture are still generally limited to making pre-assembled, on-ordered and sometimes expensive-to-make furniture.

Numerous methods have been devised to hold two or more rods or other linear portions together to form furniture or other three-dimensional structures in an attempt to make them modular, sturdy and/or less expensive. For example, the patents of Kersey (U.S. Pat. No. 2,252,126), Swartwout (U.S. Pat. No. 2,310,326), Moltchan (U.S. Pat. No. 3,121,439) and Cohen (U.S. Pat. No. 3,184,075) include small metallic clips or sleeves to hold multiple rods together. The patent of Licari (U.S. Pat. No. 5,152,230) utilizes various plastic joining means which have a recess with a narrow throat, each of which can move in an arc around the perimeter of an item to which it is attached, and is integrally molded to an item to be joined.

The patent of Belokin, Jr. (U.S. Pat. No. 4,480,756) discloses a display rack held together by multiply bent rods. The modular display unit of Ashton (U.S. Pat. No. 4,508,230) has panels which are attached together by interlocking means on adjacent units. The separable piece of furniture of Mathiesen (U.S. Pat. No. 4,603,906) has wire panel elements which are joined on their edges with protruding coupling parts which insert into holding portions.

To hold linear portions together, Costello (U.S. Pat. No. 2,554,015) has a yoke which loosely encircles the overlapped ends of a pair of bars or rods, and a wedge with an inclined, interior groove. The wedge is driven between one of the bars or rods and the yoke.

There remains a need for modular furniture which can be made inexpensively, can be easily assembled by a consumer, and is both sturdy and lightweight.

It is therefore an object of the invention herein to provide a method and modular unit for making furniture which is sturdy, decorative, and inexpensive. The furniture of the invention is as easy or easier to assemble than prior pieces of comparable furniture. In addition, the method and modular unit of the invention may be used for many different types of furniture, so that out of the same modular pieces, different furniture may be constructed, and so that a consumer may have many different pieces of furniture which are coordinated in design.

Other objects and advantages will be more fully apparent from the following disclosure and appended claims.

SUMMARY OF THE INVENTION

The modular unit of the invention includes at least one connector for a plurality of rods. The connector comprises an outer tension band; a compression member which fits within the outer tension band; and clusters of from one to three structural rods at the end of each leg of the compression member and within the outer tension band.

Each compression member contains an offset incline surface between opposing sections, and a hole through both sections and between the starting and ending points of the incline surface. The holes provide space for a tightening fastener to be inserted. When force is applied to the fastener to bring the compression member sections together, the incline surface transmits the force at right angles and the compression member expands until the structural rods are tight against the inner wall of the outer tension band. The tightening fastener and incline surface have a mechanical advantage that multiplies the expanding force.

The connector has 2, 3 or 4 legs forming the compression member, and a cluster of structural rods at the end of each leg. The clusters, each containing 1–3 structural rods, have symmetrically shaped structural rods, so nesting will occur between the outer tension band and the compression member. The nesting occurs because a natural triangulation is formed by three structural rods, and as the number of structural rods is reduced from three to two and one, the perimeter length of the outer band is reduced.

A connector with two legs has a leg at each of the opposite ends of the connector. Connectors with three legs form a triangulation from the center of the connector out. Connectors with four legs form a cross from the center out when the connector is square or an offset cross if a rectangular four legged connector is used. Only one tightening fastener is used with each connector, and the clamping procedures are the same regardless of the number of legs.

A modular framing unit is formed with one or more connectors holding together selected rectangular, U-shaped and other rod portions. One or more similar or different modular framing units are held together with the same or additional connectors.

Other aspects and features of the invention will be more fully apparent from the following disclosure and appended claims.

BRIEF DESCRIPTION OF THE DRAWINGS

FIG. 1 is an elevational view of an outer tension band of the invention having two legs in which six structural rods are held.

FIG. 2 is a top plan view of the outer tension band of FIG. 1.

FIG. 3 is a bottom plan view of the outer tension band of FIG. 1.

DETAILED DESCRIPTION OF THE INVENTION AND PREFERRED EMBODIMENTS THEREOF

Figure 4:
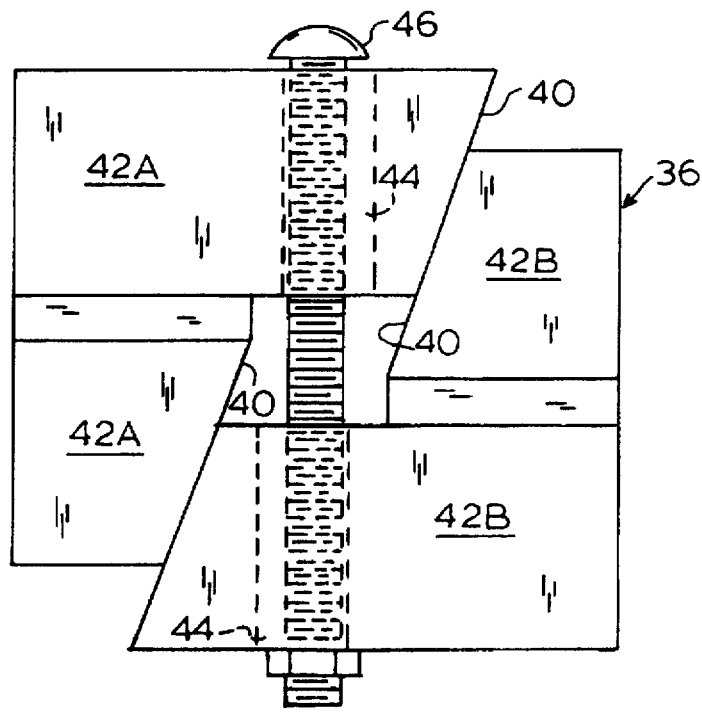
FIG. 4 is an elevational side view of a compression member of the invention prior to tightening.

The present invention is for a modular framing unit. The connector 30 of the invention holding the various other components of the modular framing unit 32 together comprises an outer tension band 34 and a compression member 36 which fits within outer tension band 34 (FIGS. 1–3). As discussed below, compression member 36 of connector 30 of the invention may have 2–4 legs extending outward from the center of the connector. In addition to outer tension band 34 and compression member 36, connector 30 comprises clusters of from one to three structural rods 38 at the end of each leg of compression member 36 and within outer tension band 34.

Figure 5:
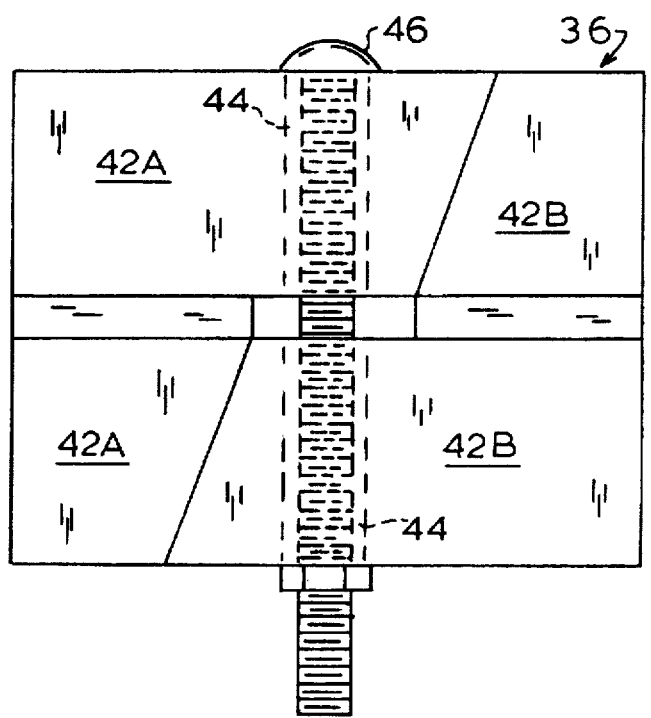
FIG. 5 is an elevational side view of a compression member of the invention after tightening.
Figure 6:
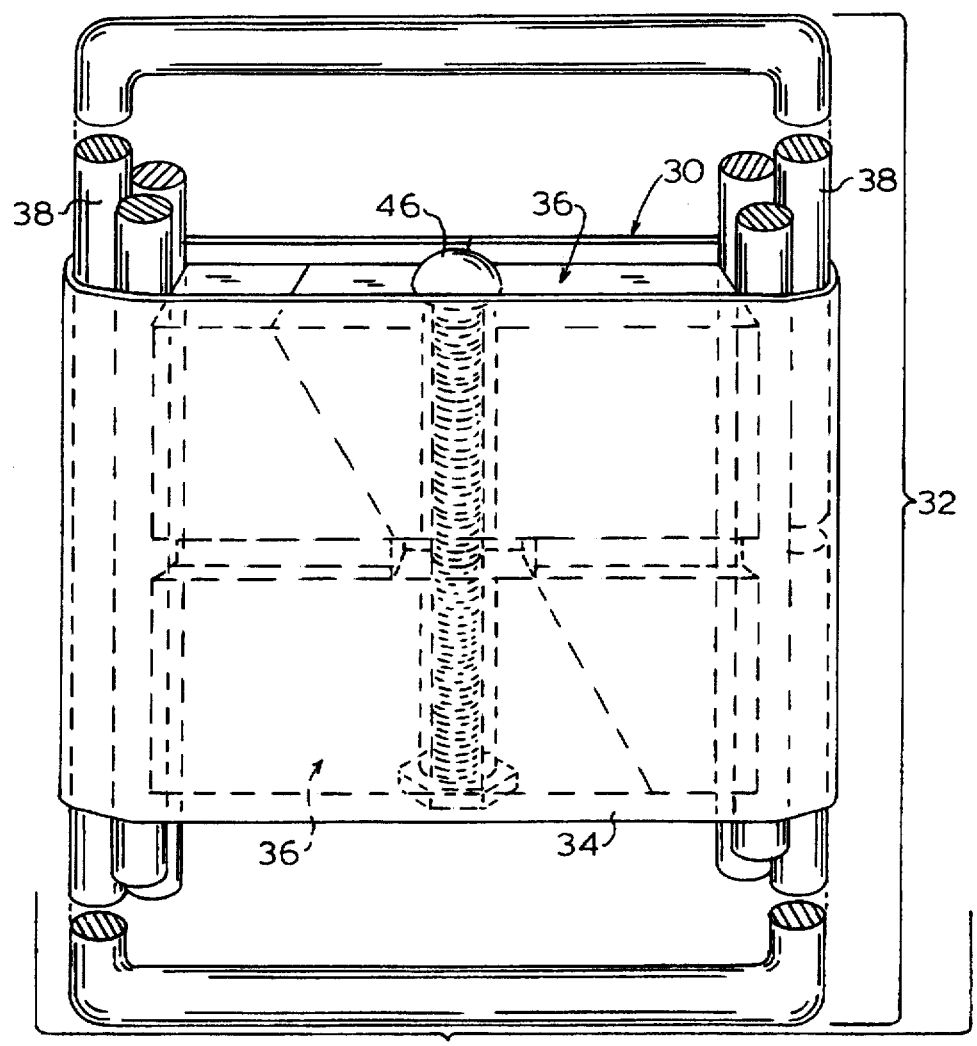
FIG. 6 is an elevational side view of the modular framing unit of the invention including an outer tension band showing a compression member and structural rods inside the outer tension band.

Each compression member 36 contains an offset incline surface 40 between opposing sections 42A,B of compression member 36, and a hole 44 through each section 42A, B (FIGS. 4–5). When opposing sections 42A,B are aligned as shown in FIGS. 5 and 6, hole 44 extending through the larger top portion of section 42A to the horizontal edge adjacent the incline surface 40 of the top portion of section 42A is aligned with the hole in the lower portion of section 42B. The holes 44 in sections 42A,B provide space for a tightening fastener 46, preferably a threaded bolt or screw, to be inserted.

Although hole 44 in section 42A may extend all the way through both pieces of compression member 36 so that the distal end of fastener protrudes through the exterior of one of sections 42A,B and is held by a nut or other means, alternate means for holding the distal end of threaded fastener 46 in the hole may be used as are known in the art. For example, the plastic material of which compression member 36 is preferably made may be drilled, and then either a metal sleeve that is interiorly and exteriorly threaded, a T-nut, or other interiorly threaded sleeve may be tapped or otherwise inserted, into which sleeve the fastener may be threaded. Alternatively, a sleeve may be molded into compression member 36 during manufacture and threaded later.

Figure 7:
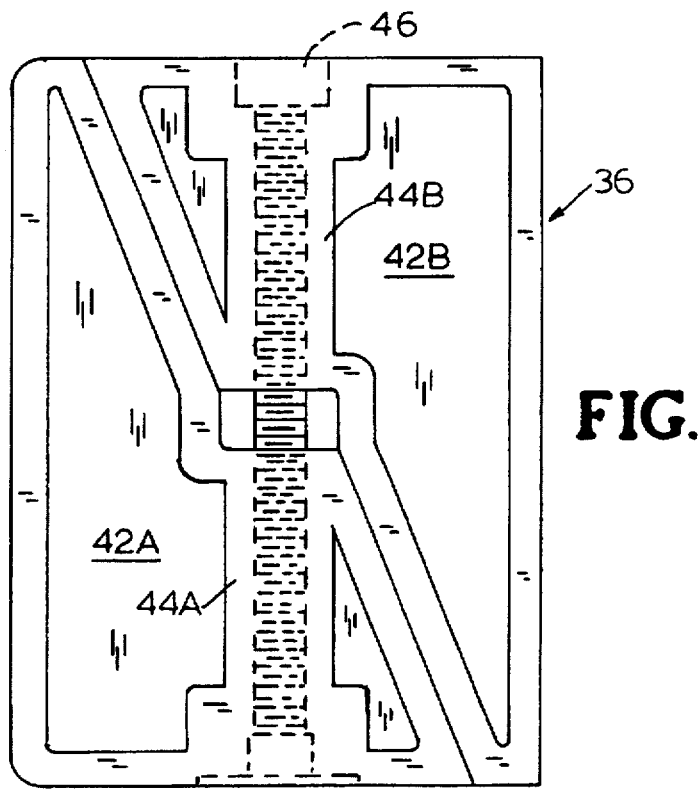
FIG. 7 is an elevational view of the compression member showing the preferred external topology thereof.

The fastener 46 preferably has a hex-head cap, which is set into the compression member 36 in an area having an appropriate diameter to hold the cap without protruding from compression member 36 as shown in FIG. 7.

In any case, when force is applied to fastener 46 to bring sections 42A,B of compression member 36 together, for example, by tightening a threaded fastener 46 into a threaded sleeve mounted in hole 44 in the compression member, incline surface 40 transmits the force at right angles, and the width of compression member 36 expands until structural rods 38 are tight against the inner wall of outer tension band 34. Tightening fastener 46 and incline surface have a mechanical advantage that multiplies the expanding force.

The preferred compression member 36 is a modified planar piece as is shown in FIG. 7. Around the exterior edges of each section 42A,B, and in the area surrounding each hole 44, each section of the compression member preferably has a maximum thickness, e.g., about 4 mm. In other words, these areas are raised to provide additional strength. In order to conserve material and for ease in molding, the remaining, interior areas are preferably thinner, e.g., about 3 mm. For simplicity of representation of the remaining features of compression member 36, this preferred exterior topology of the compression member is only shown in FIG. 7, but it is understood that the compression members shown in the other figures would also preferably have this form.

Figure 11:
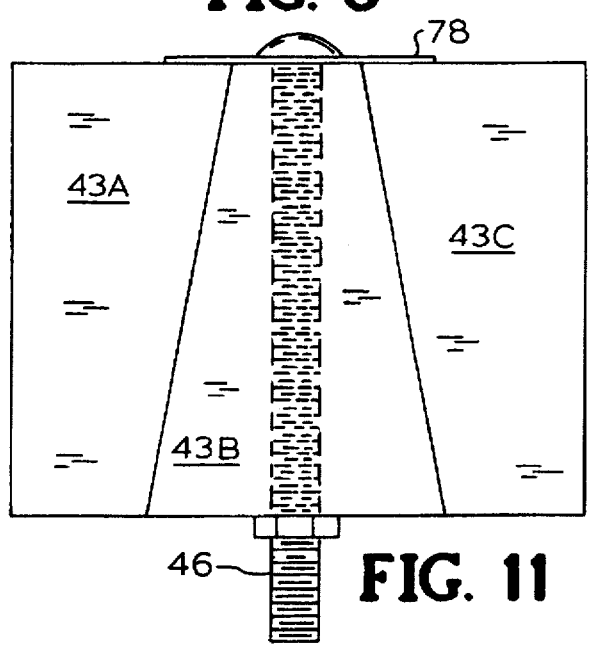
FIG. 11 is an elevational side view of an alternate embodiment of a compression member.

While the preferred compression member has two sections as is shown in FIGS. 4–5, and 7, the compression member may have additional pieces with an incline surface as shown in FIG. 11 which has three sections 43 A,B,C. Where the incline surface is continuous so that the pieces may slide past each other, a cap piece 78 may be used to hold the pieces in place relative to each other within the outer tension band (band not shown in this Figure). Such cap pieces may also be used in the connectors having three or four legs (discussed below) to keep the rectangular piece(s) 48 and compression members from sliding past each other.

Figure 8:
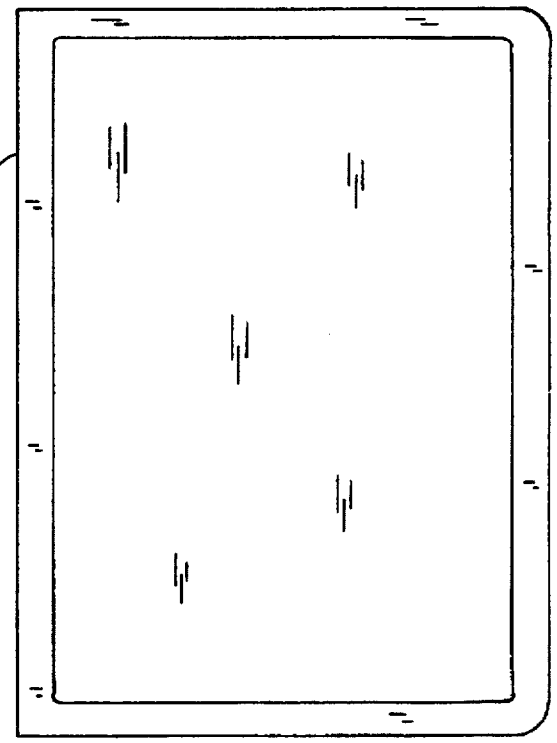
FIG. 8 is an elevational view of a rectangular blank piece which is preferably used in compression members having three or four legs.
Figure 9:
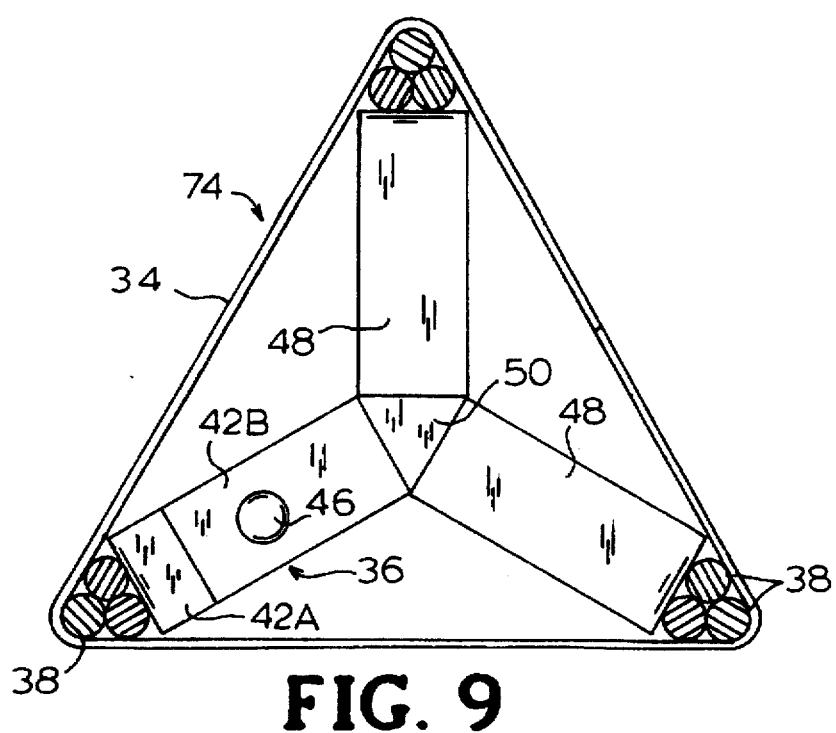
FIG. 9 is an upper plan view of a three-legged connector.
Figure 10:
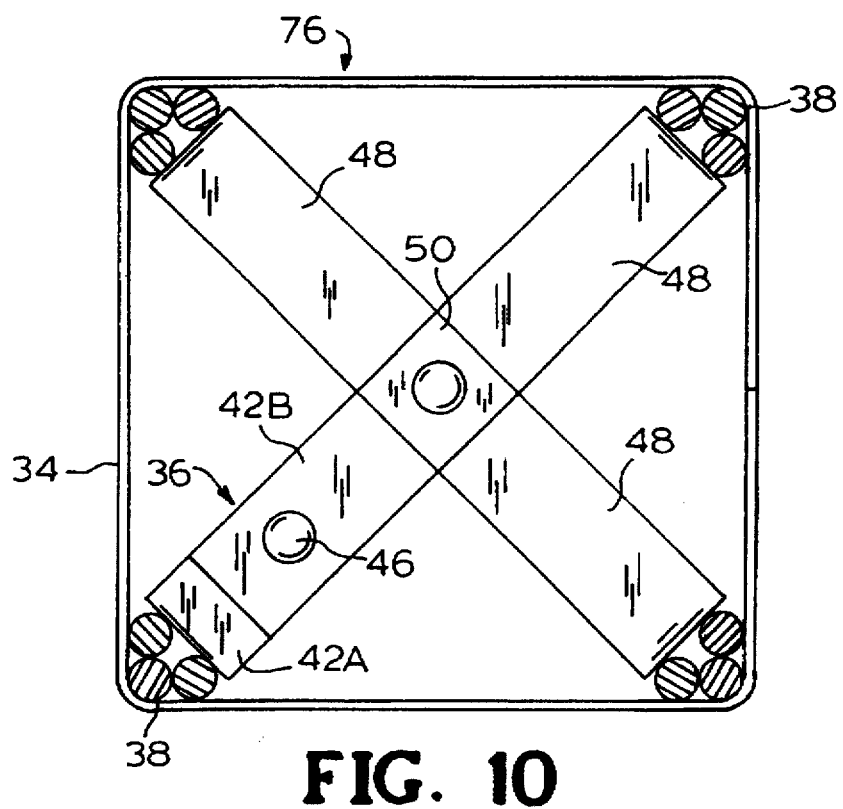
FIG. 10 is an upper plan view of a four-legged connector.

Each connector 30 has 2, 3 or 4 legs, determined by the type of compression member used, and a cluster of structural rods 38 positioned at the end of each leg. Each "leg" is formed by either the outer edge of one section 42A,B (FIG. 7) or by the outer edge of a rectangular piece 48 (FIG. 8). A connector 30 with two legs has each leg at opposite ends of the connector (FIGS. 1–3). Connectors 74 with three legs (FIG. 9) form a triangulation from the center of the connector out. Connectors 76 with four legs (FIG. 10) form a cross from the center out when the connector is square or an offset cross if a rectangular four legged connector is used. In connectors with either three or four legs, the preferred way of making the compression member comprises utilizing one compression member as is shown in FIG. 7, plus 2–3 rectangular pieces 48 shown individually in FIG. 8, and together with a compression member in FIGS. 9–10. For any one connector having three or four legs, rectangular pieces 48 extend from a center post 50 to the corners of the tension band where the compression member is not located. Center post 50 is triangular in a connector with three legs, and square in a connector with four legs. Each rectangular piece 48 provides rigidity and holds the structural rods between the outer end of rectangular piece 48 and outer tension band 34. Because only one compression member is preferably used in a connector, preferably only one tightening fastener 46 is used with each connector, and the clamping procedures are the same regardless of the number of legs.

Figure 24:
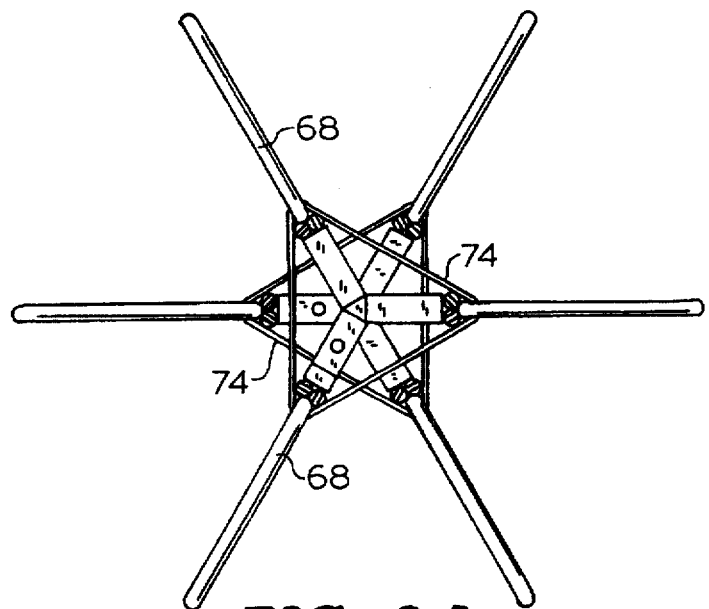
FIG. 24 is a top plan view of the legs of a piece of furniture made with the modular unit of the invention having two three-legged connectors.
Figure 25:
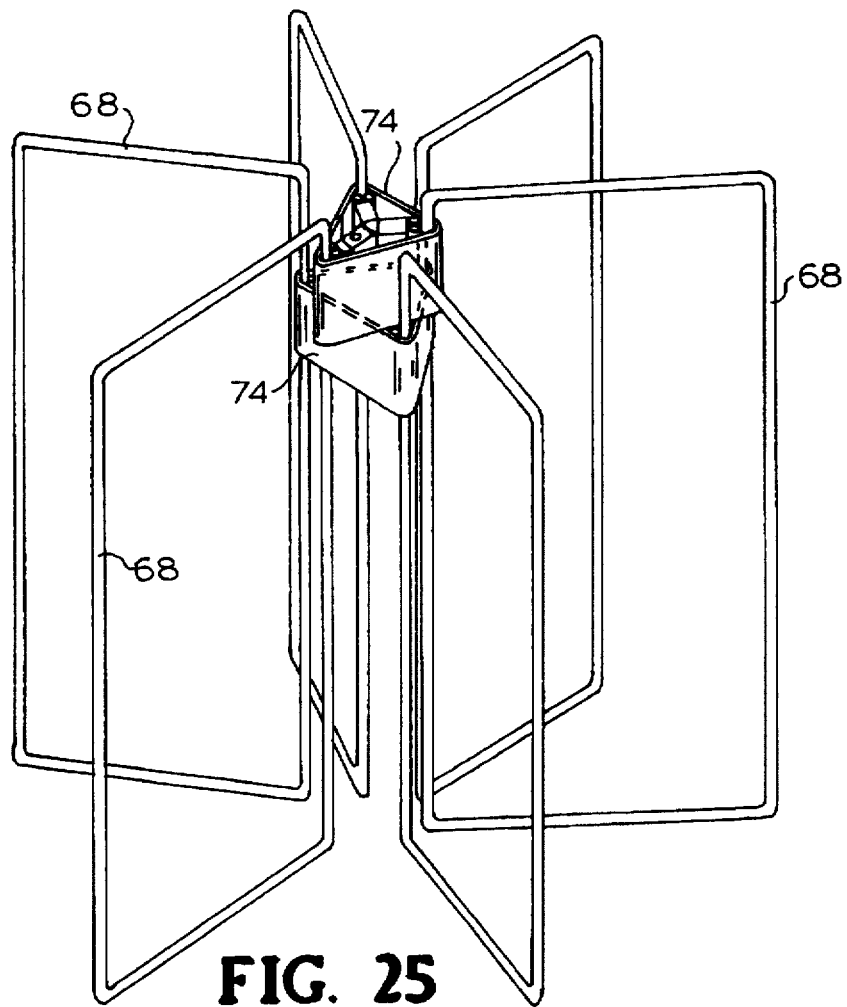
FIG. 25 is a side perspective view of the legs and connector shown in FIG. 24.

Connectors with three or four legs are preferably used for products having a central column or pillar structure (FIGS. 24–27). Slender rectangular shaped structural rods or individual rods are used to make a sturdy center support. One or more connectors are used to support torsional and heavy loads. Two triangular connectors may be used, one above the other, but offset so that there are six sets of rods extending out of the combined connectors (FIGS. 24–25).

The clusters of structural rods 38, each contain 1–3, preferably 2 or 3, structural rods 38. The rods must be of a symmetrical shape, e.g., round or angled, so nesting will occur between the outer tension band and the compression member. The nesting occurs best with three structural rods because a natural triangulation is formed, which is particularly useful for structures which extend in three dimensions from an end of a connector.

Figure 28:
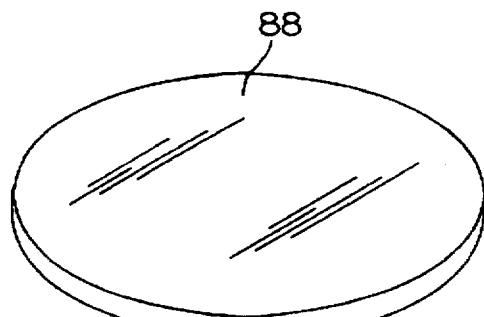
FIG. 28 is a top plan view of an outer tension band of the invention in which four structural rods are held.

Although the Figures generally show three structural rods 38 at each leg of the connector, the invention also includes connectors in which there are two rods at each leg as is shown in FIG. 28. This configuration may be used when the structure only extends in two dimensions from the ends of the particular connector. It is understood that in all cases where only one or two rods protrude from one side of an outer tension band, only two structural rods are sufficient for the structure, and the three structural rods are only shown for illustrative purposes, to indicate that other structural features could be attached at that outer tension band. All of the Figures showing three structural rods in such cases could also use only two structural rods, as is shown in FIG. 28.

Whether there are two or three structural rods at a particular leg of each compression member, all of the included rods and rod-shaped portions are contiguous to each other along at least the portion of their length which is held within and at that end of the tension band.

Although, as discussed below, there are numerous variations included within the invention, most products containing the invention utilize the first embodiment of the invention in which there is a connector with structural rods and at least one of the structural rods is formed into a slender rectangular shape made from one continuous structural rod. In these products, the short sides of the rectangular shape form the foot and top of the product and the long sides provide the vertical support. The ends of the continuous structural rod are located along one long side, preferably near the foot.

For 5/16-inch diameter rods, a rectangle width up to about 4¼ inches provides sufficient strength for most anticipated uses. If there are long distances between connectors on a piece of furniture, thicker rods would be expected to be used to increase the rigidity and to support more weight, such as for heavier, industrial uses.

Outer tension band 34 of connector 30 has internal dimensions so that the band circumscribes the area needing a connecting point. The outer tension band is preferably made of either seamless or butt-welded carbon steel or stainless steel. Outer tension band 34 can cover the ends of the continuous structural rod 38 and hide the ends from view. In various products made according to the invention, additional outer tension bands are slipped over one or more portions of the rectangular shaped rods to provide additional connecting points to form the different products. The location of the outer tension bands 34 along a structural rod may be adjusted to adjust the height of shelves and the like connected to outer tension band 34, so long as the adjustment does not result in movement of an outer tension band which is supposed to enclose the ends of a structural rod to another position where the ends are not enclosed.

Figure 12:
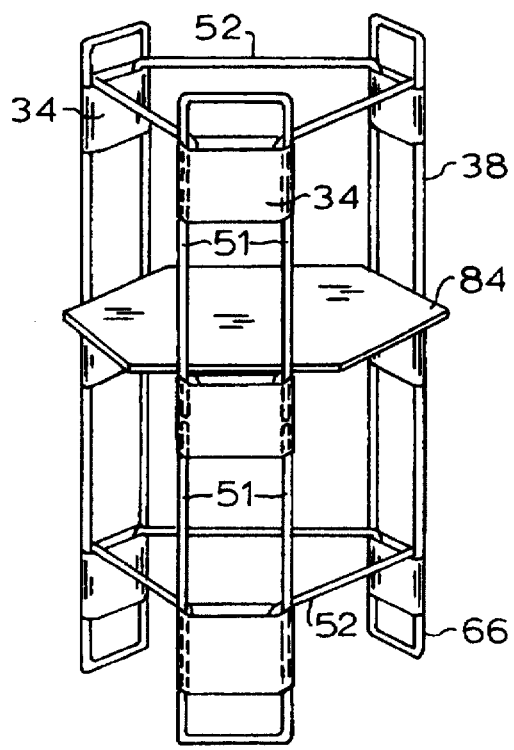
FIG. 12 is a perspective view of a shelf unit having hexagonal shelves made using the modular unit of the invention.

An alternative to the slender rectangular shape is the "U" shaped structural member. This shape does not have four sides so an inverted "U" shape 51 can be placed end to end with a first "U" shape (FIG. 12). For a slender U-shape, an outer tension band is placed so both ends of each "U" shape are covered. This procedure allows an extended slender rectangular shape to be formed with additional outer tension bands added to both ends for more connecting points.

Figure 13:
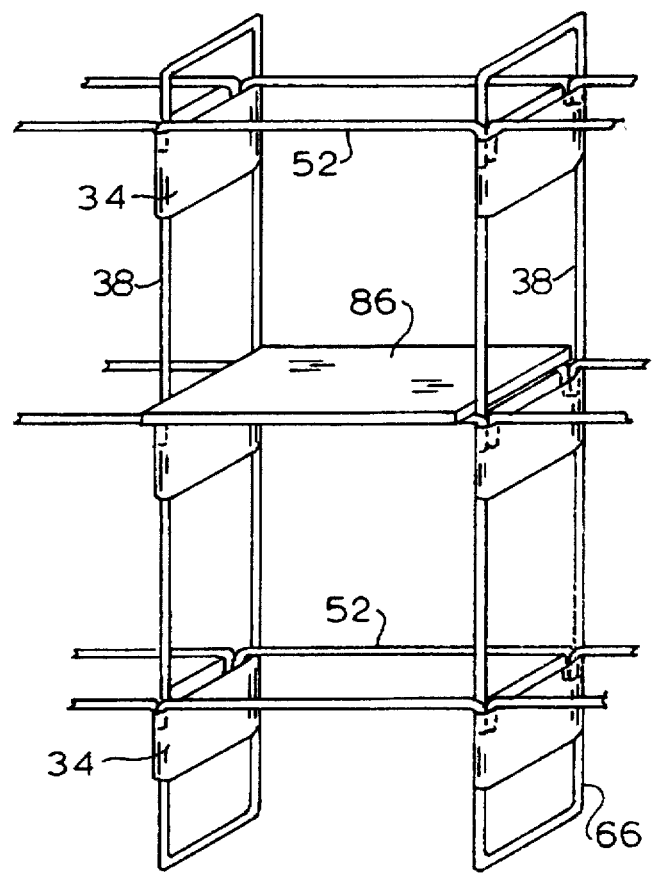
FIG. 13 is a perspective view of a shelf unit having rectangular shelves made using the modular unit of the invention.

In many products containing the invention, the slender rectangular shape with the foot on the floor forms one side of a product and additional slender rectangular shapes are added as more sides or supports are needed (FIG. 13). A "U" shaped structural member 52, in which the bottom (or top for an inverted "U") of the "U" extends horizontally with the legs of the "U" no longer than the width of the outer tension band preferably forms the connecting link between two or more sides (FIG. 13). In such products, each leg of a connector having two legs receives a horizontal "U" shaped member when rectangular or square shaped products are needed. Each additional connector on each slender rectangular shaped side provides locations for additional connecting links.

Figure 21:
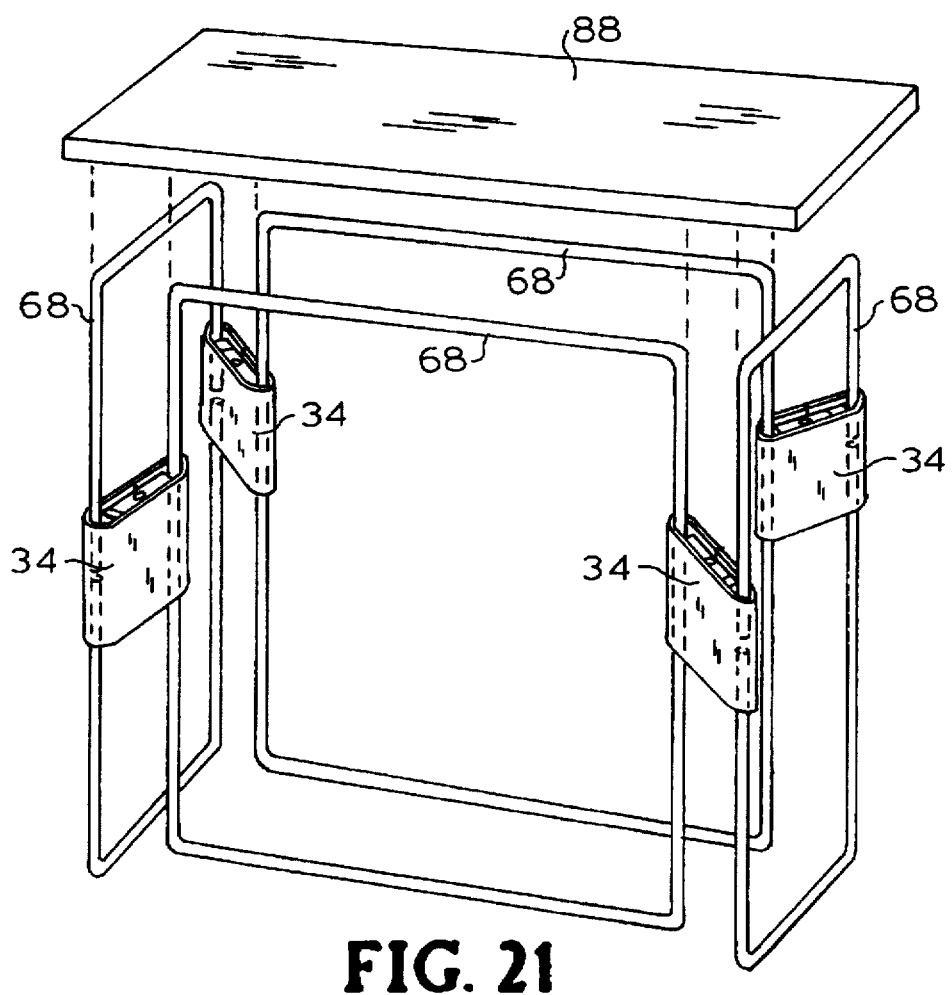
FIG. 21 is a perspective view of a table or bench made with the modular unit of the invention.

An alternative to "U" shaped connecting links is the rectangular shaped connecting link. The rectangular shaped connecting link performs the same task as two horizontal "U" shaped structural members except only one connector on each side is used (FIG. 21). This method reduces the overall number of connectors needed to construct a product and the outer tension band is used to cover the ends of the continuous structural rod used to form the rectangular shaped connecting link.

Figure 22:
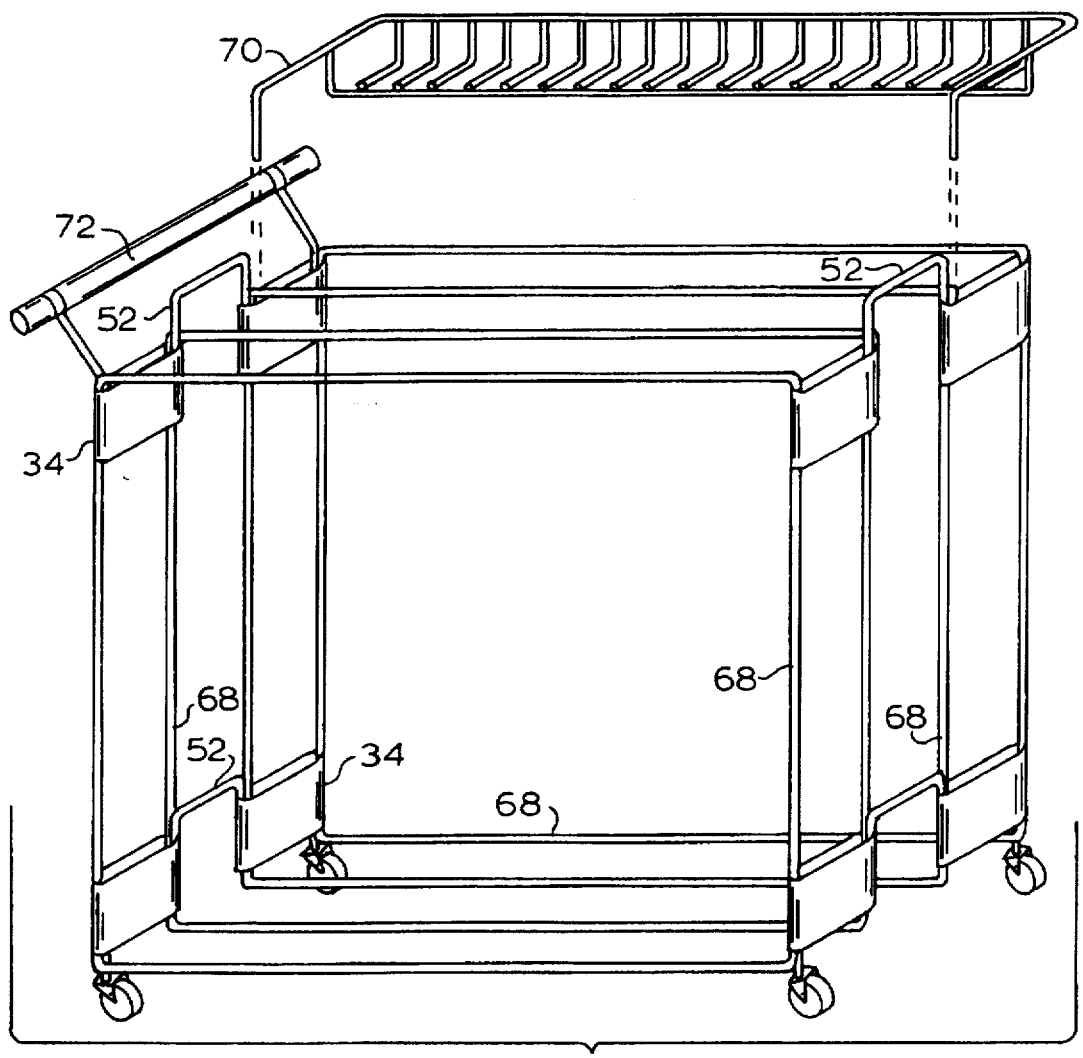
FIG. 22 is a perspective view of a table or bench made with the modular unit of the invention.

Another method of construction utilizes two or more large rectangular shapes each made from continuous structural rods with one placed in front of the other (FIG. 22). Four or more two-legged connectors are used by placing one side of the two large rectangular shapes through the outer tension band. The connectors are placed on the vertical members of the two large rectangular shapes and at each corner. A second set of large rectangular shapes is added behind the first set. Horizontal "U" shaped structural members 52, as discussed above, with the legs of the "U" within the outer tension band forms the connecting link between each set of large rectangular shapes. Additional items which may be added to the bottom connectors include feet, casters, stabilizers, and the like, and the top connectors may include such items as handles, towel bars, and the like.

Figure 14:
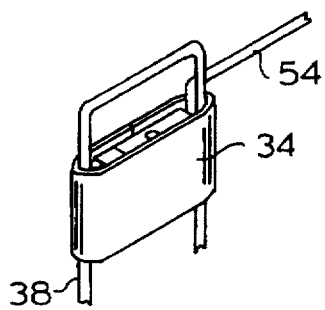
FIG. 14 is a perspective view of a simple one-rung rack which may be held in a connector of the invention.
Figure 15:
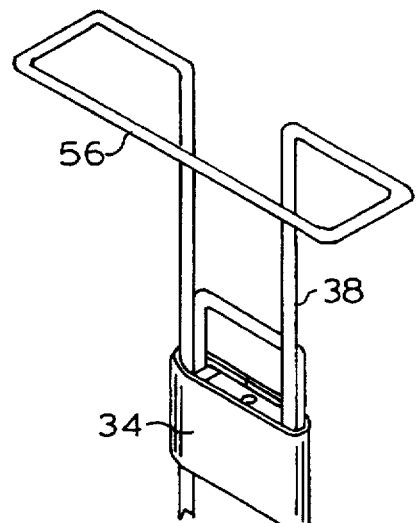
FIG. 15 is a perspective view of a bent handle which may be held in a connector of the invention.
Figure 16:
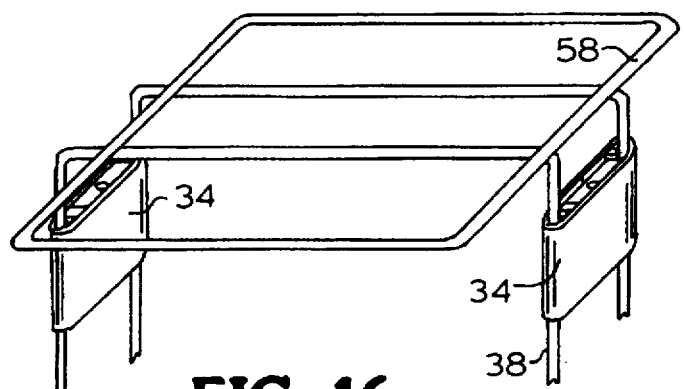
FIG. 16 is a perspective view of a multiple rung rack which may be held in a connector of the invention.
Figure 17:
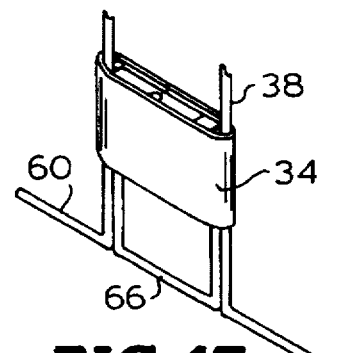
FIG. 17 is a perspective view of L-shaped floor supports which may be held in a connector of the invention.
Figure 18:
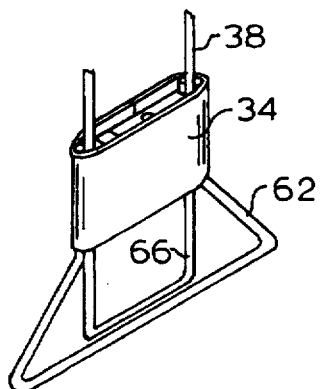
FIG. 18 is a perspective view of a triangle base floor support which may be held in a connector of the invention.
Figure 19:
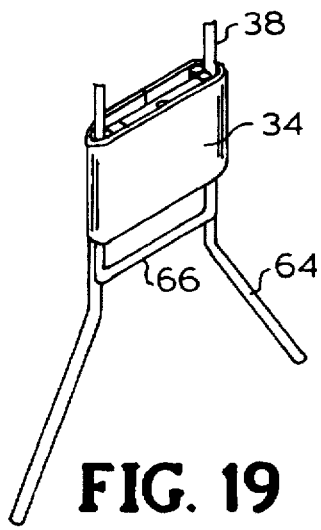
FIG. 19 is a perspective view of extended legs which may be held in a connector of the invention.

Examples of items which may be added to connectors include a simple one-rung rack 54 as shown in FIG. 14, a handle 56 bent in any of a number of possible forms, one of which is shown in FIG. 15, and a multiple rung rack 58 shown in FIG. 16. Various floor support pieces may be added to a connector, either in addition to or instead of a lower end 66 of a rectangular support rod. Examples include use of one or more L-shaped floor supports 60 as shown in FIG. 17, a triangle base floor support 62 as shown in FIG. 18, and extended legs 64 as shown in FIG. 19.

Additional rod shaped portions may be added to the furniture of the invention by utilizing an end or other portion of a straight or bent rod in a cluster at one or more legs of a connector, with the remaining portion of the rod which extends outside the outer tension band being formed for the desired task (towel rack, connector to another portion of the furniture), or being used to support other structures, such as shelves, seats, handles, and the like. The other structures may be formed of rod shaped material, or may be glass, metal, fabric covered, and other furniture and shelving components as are known in the art.

In addition to variations in the form and type of the rods and rod-shaped portions in a band and in the number of legs within the tension band, there are many other variations of construction that may be made utilizing each of these embodiments and which are included within the invention. Thus, the location of the tension band(s) on the rod(s) or rod-portions, the length of the four sides of the various rectangular rods and of the alternative rod forms, and the angle at which the rod extends away from the band may be varied, as well as the width and height of the bands. Also, the number of and type of connectors on a particular item constructed using the modular framing unit(s) may be varied. Identical or different types of connectors may be used in the same item.

The features and advantages of the present invention will be more clearly understood by reference to the following examples of furniture which can be made using the modular framing unit of the invention, which are not to be construed as limiting the invention.

EXAMPLES

Example 1

Stand Having Multiple Hexagonal Shelves

As shown in FIG. 12, a stand having multiple hexagonal shelves may be constructed using the modular framing unit of the invention. There are many ways to construct such a multiple-shelf unit. The example shown in the Figure utilizes three rectangular pieces (one for each side and forming the three legs). Just below each level where a shelf 84 is to be placed, a connector is placed on each of the three rectangular pieces. A U-shaped structural member 52 extends horizontally between each pair of connectors to form shelf supports. Hexagonal shelf 84 as shown placed on the central set of U-shaped structural members 52 in FIG. 12 may then be inserted into the support structure formed by the structural rods, connectors, and U-shaped pieces. Shelf 84 may be made of any shelf type material as is known in the art, e.g., glass, vinyl, wood, metal, clay tile and the like. Because of the shape of the shelves and their positioning within the supports of the furniture, these shelves do not need to be attached to the furniture but may simply rest on the supports.

Example 2

A Stand Having Multiple Rectangular Shelves

As shown in FIG. 13, two (or more) rectangular supports formed of structural rods may be aligned in a row, connected together with U-shaped members 52. On each pair of parallel U-shaped pieces a shelf 86, made as is known in the art, may be placed. Shelves 86 are preferably fastened to the U-shaped pieces by means known in the art to prevent their movement to a position where they cannot accept weight placed on shelf 86.

Example 3

Table or bench

Figure 20:
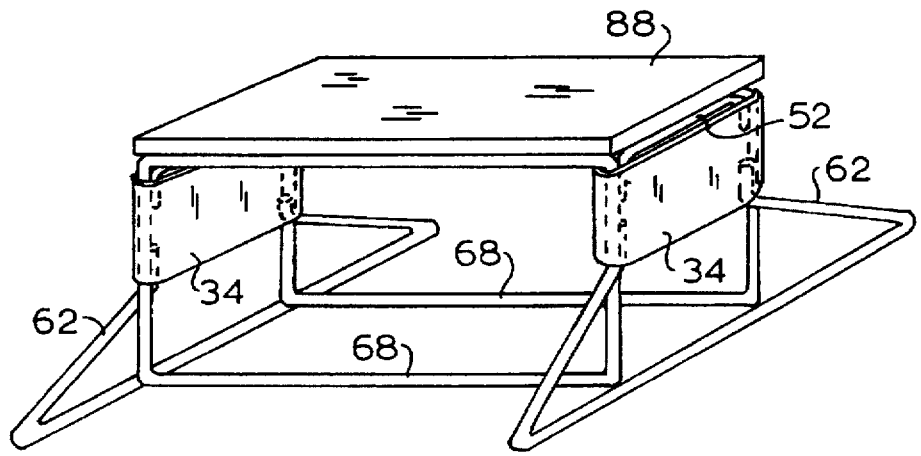
FIG. 20 is a perspective view of a table which is made with the modular unit of the invention.

FIG. 20 shows a table or bench having two parallel wide rectangular legs 68 connected together with upper U-shaped structural members 52. Extending from the bottom side of each outer tension band 34 is a triangle base floor support 62 to provide added stability. A horizontal portion 88 forming a seat or table top is placed on top of the bench or table, respectively, and attached thereto by means known in the art.

FIG. 21 shows another table or bench made of four rectangular legs 68, each of which parallels the nearest edge of a horizontal portion 88 forming the seat or table top which is placed on top of the furniture. Legs 68 are connected to each other by four connectors. As shown, each outer tension band 34 extends between parallel adjacent sides of different legs 68.

Example 4

Cart

Figure 23:
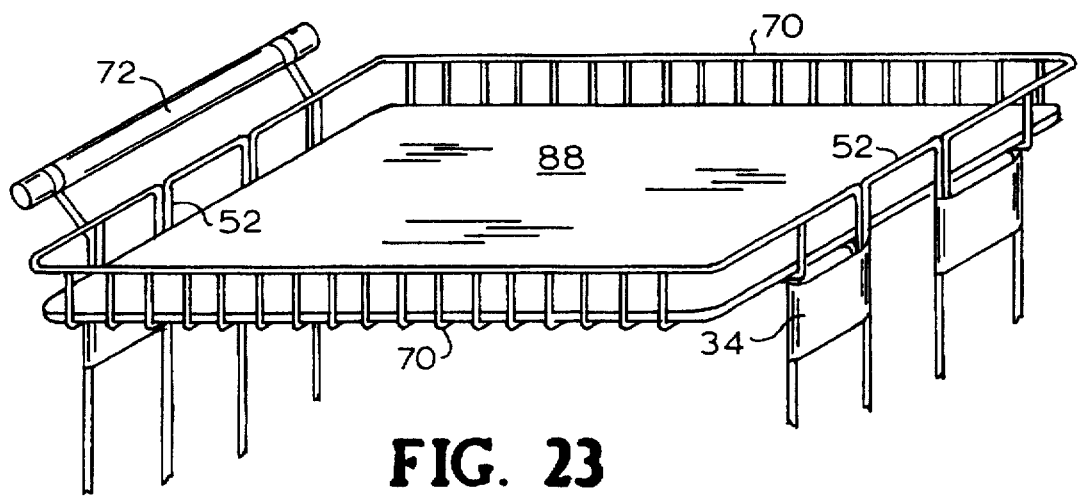
FIG. 23 is a perspective view of the top shelf for a cart of FIG. 22.

FIGS. 22–23 show a cart which is made of parallel four rectangular legs 68. The central two legs 68 are held together by U-shaped structural members 52, between top and bottom outer tension bands, which in turn connect each central leg 68 to the outer leg adjacent it. A side shelf extension 70 may be placed along each upper and lower side of the cart so that lower feet on the shelf tension fit in an outer extension band. After shelf extensions 70 are installed, a horizontal portion 88 may be placed within each pair of shelf extensions 70 to form a shelf. At one or both ends of the cart, a handle bar 72 may be placed so that the supports for the handle bar are inserted in outer tension bands 34 as shown in FIGS. 22–23.

Example 5

Table or bench support

FIGS. 24–25 show the base of a piece of furniture made with two three-legged connectors 74. As shown, the two triangular connectors 74 are placed one on top of the other with the points of one triangle offset from the points of the other triangle so that the upper horizontal edge of the rectangular legs 68 extend outward like spokes from the center of the piece of furniture. This arrangement provides a sturdy support for a table or bench top (not shown) or the like.

Example 6

Stool or table made with a four-legged connector

Figure 26:
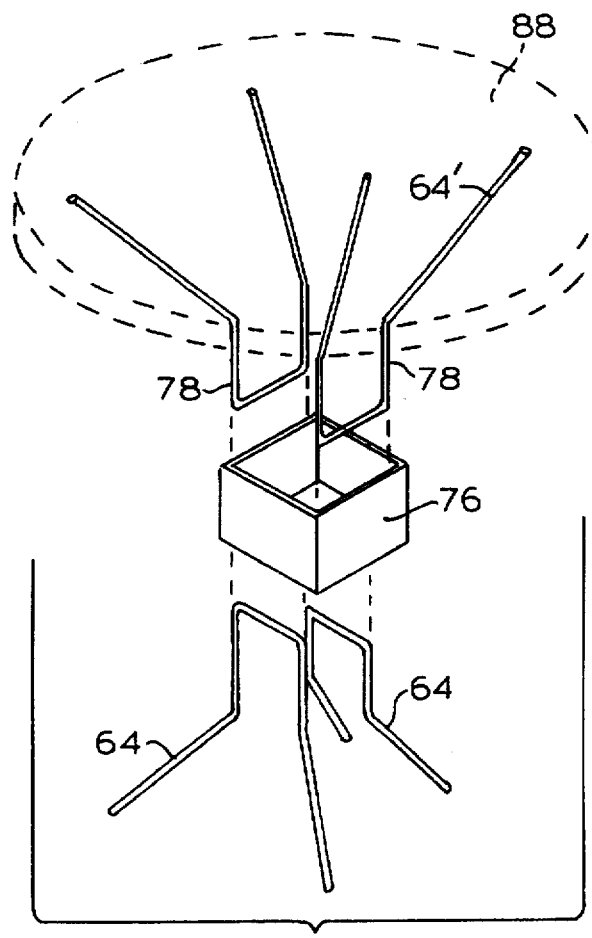
FIG. 26 is a side perspective view of the legs and connector of a stool or table made with a four-legged connector (not shown).
Figure 27:
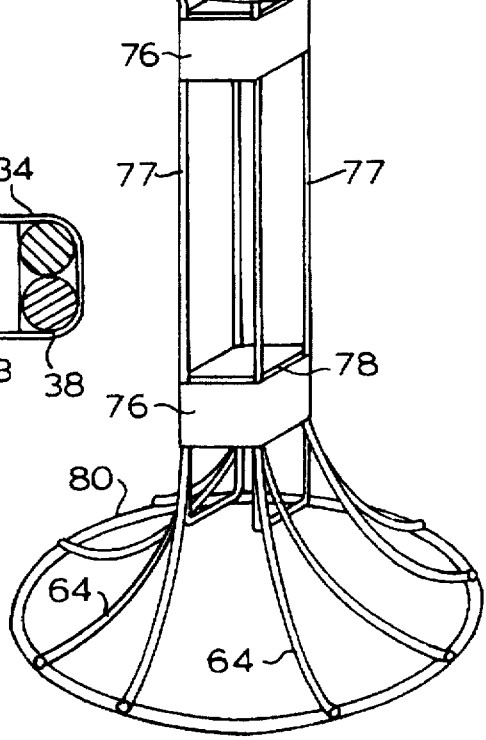
FIG. 27 is a side perspective view of a stool or table made with two four-legged connectors (not shown).

FIGS. 26–27 show two different types of stool or table made with four-legged connectors 76. In FIG. 26, a single four-legged connector (compression members not shown for simplicity) has two U-shaped portions inserted above, and two below connector 76. Each U-shaped portion is bent to form either an extended leg 64 or an upper support for a horizontal portion 88.

In FIG. 27, two four-legged connectors are used to hold two elongated rectangular structural rods together. Curved extended legs 64 extend from beneath the lower connector 76 and are attached at their distal ends by a circular base piece 80. The support mechanism (not shown) for the upper horizontal portion 88 may be either as in FIG. 27 or may be a mirror image of the extended legs 64 and circular base piece.

Example 7

Wire shelf

Figure 29:
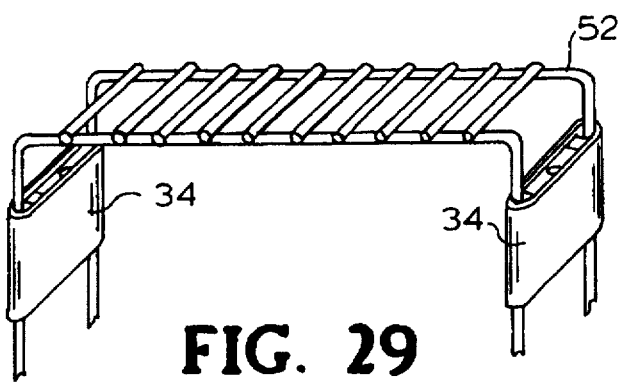
FIG. 29 is a perspective view of a wire shelf made according to the invention.

As shown in FIG. 29, multiple U-shaped members may be attached together to form a shelf. Two or more U-shaped structural members 52 can be connected, for example, by a series of parallel wires, each of which is perpendicular to the U-shaped members, and welded thereto. The spacing between the U-shaped members is such that their ends can be inserted in connectors of the invention on a chosen piece of furniture.

Although the examples given above pertain only to household furniture, the invention also contemplates other items made using the modular unit of the invention. Thus, decorative structures, trays, workbenches, shelving for stores or other places, and the like may be made using the method and modular unit of the invention.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A connector for connecting linear portions of a plurality of structural rods, said connector comprising:

(a) an outer tension band through and within which said linear portions of said rods are adapted to be seated and extended in parallel relation to inner walls of said band;

(b) an outwardly expandable compression member having adjacent plural components some of the components having outer laterally spaced parallel planar surfaces and all of the components having inner angular slide surfaces, said compression member being loosely fitted within said outer tension band with said components positioned such that said outer planar surfaces are positioned adjacent and substantially parallel to the inner surface of said outer tension band and each of said angular slide surfaces is positioned in slidable contacting relation with respect to another inner angular surface formed by one of the of said compression member, said compression member further having a hole formed along an axis located between and parallel to said planar surfaces and adapted to be parallel to the linear portions of said rods being connected by said connector; and (e) a tightening member located in said hole and operable when tightened to force each said angular slide surface to slide on and with respect to said another inner angular surface and adapted to force said planar surfaces to move outwardly in firm contact with respect to said linear portions of said rods being connected and to force said rods against the inner surface of said connecting band for securement thereto.

2. The connector of claim 1, wherein said compression member forms a first leg, and further comprising at least one rectangular piece forming a second leg.

3. A modular framing unit, comprising:

(a) a first rod having two ends and being formed into a shape of a rectangle, said rectangle having opposite parallel sides with said ends being along one of said parallel sides;

(b) a connector, comprising:

(i) an outer tension band which has internal dimensions so that said band fits around a portion of said rectangle, and encloses both of said ends as well as a portion of the parallel side of said first rod which is opposite said ends;

(ii) a compression member which fits within said outer tension band between said parallel sides, and which has a hole; and (iii) a tightening portion, which fits in said hole, wherein when said tightening portion is tightened in said hole, said compression member is forced outward against said parallel sides, causing said outer tension band and said first rod to be stiffened and said rod to be held firmly within said outer tension band.

4. The modular framing unit of claim 3, further comprising for each parallel side, two additional rod portions parallel to each of said parallel sides and contiguous with a lengthwise section of said parallel side.

5. The modular framing unit of claim 4, wherein at least one of said additional rod portions is part of a second modular framing unit.

6. The modular framing unit of claim 3, wherein said compression member comprises two side portions and said hole comprises a threaded hole in each of said portions, wherein each side portion has a top side and a bottom side, a third side perpendicular to said top side and said bottom side, and a fourth sloping side which is not parallel to said third side, wherein said side portions slidingly fit against each other along said sloping sides, so that when said tightening portion is threaded in said hole, said side portions are brought together, causing said compression member to increase in width and to force said rods outward in said tension band.

7. The modular framing unit of claim 6, wherein each said sloping side comprises an upper sloping edge and a lower sloping edge, said edges being in different, parallel planes.

8. The modular framing unit of claim 3, further comprising at least one rectangular blank piece held within said outer tension band, and at least one additional rod formed into a rectangle and having opposite parallel sides, wherein one of said parallel sides of said additional rod is held within said outer tension band parallel to and contiguous to a section of a parallel side of said first rod.

9. The modular framing unit of claim 8, wherein there is one rectangular blank piece, so that when said tightening portion is tightened, said outer tension band has a triangular cross-sectional shape.

10. The modular framing unit of claim 8, wherein there are two rectangular blank pieces, so that when said tightening portion is tightened, said outer tension band has a square cross-sectional shape.

11. The modular framing unit of claim 3, further comprising at least one additional rod portion inserted in said outer tension band, said additional rod portion selected from the group consisting of:

(a) a handle having a linear rod portion adapted to be inserted into said outer tension band;

(b) a floor support piece having a linear rod portion adapted to be inserted into said outer tension band;

(c) a U-shaped rod having a linear rod portion adapted to be inserted into said outer tension band; and (d) a shelf extension having a linear rod portion adapted to be inserted into said outer tension band.

12. A piece of furniture comprising a plurality of modular framing units, each side framing unit comprising:
  (a) a first rod having two ends and being formed into a shape of a rectangle, said rectangle having opposite parallel sides with said ends being along one of said parallel sides;
  (b) a connector, comprising:
    (i) an outer tension band which has internal dimensions so that said outer tension band fits around a portion of said rectangle, and encloses both of said ends as well as a portion of said parallel side of said rod opposite said ends;
    (ii) a compression member which fits within said outer tension band between said parallel rods, and which has a hole; and
    (iii) a tightening portion, which fits in said hole, wherein when said tightening portion is tightened in said hole, said compression member is forced outward against said rods, causing said outer tension band and said rod to be stiffened.

13. The piece of furniture of claim 12, further comprising for each parallel side, two additional rod portions parallel to each of said parallel sides and contiguous with a lengthwise section of said parallel side.

14. The piece of furniture of claim 13, wherein at least one of said additional rod portions is part of a second modular framing unit.

15. The piece of furniture of claim 12, wherein said compression member comprises two side portions and said hole comprises a threaded hole in each of said portions, wherein each side portion has a top side and a bottom side, a third side perpendicular to said top side and said bottom side, and a fourth sloping side which is not parallel to said third side, wherein said side portions slidingly fit against each other along said sloping sides, so that when said tightening portion is threaded in said hole, said side portions are brought together, causing said compression member to increase in width and to force said rods outward in said tension band.

16. The piece of furniture of 15, wherein each said sloping side comprises an upper sloping edge and a lower sloping edge, said edges being in different, parallel planes.

17. The piece of furniture of claim 12, further comprising at least one rectangular blank piece held within said outer tension band, and at least one additional rod formed into a rectangle and having opposite parallel sides, wherein one of said parallel sides of said additional rod is held within said outer tension band parallel to and contiguous to a section of a parallel side of said first rod.

18. The piece of furniture unit of claim 17, wherein there is one rectangular blank piece, so that when said tightening portion is tightened, said outer tension band has a triangular cross-sectional shape.

19. The piece of furniture of claim 17, wherein there are two rectangular blank pieces, so that when said tightening portion is tightened, said outer tension band has a square cross-sectional shape.

20. The piece of furniture of claim 12, further comprising at least one additional rod portion inserted in said outer tension band, said additional rod portion selected from the group consisting of:
  (a) a handle having a linear rod portion adapted to be inserted into said outer tension band;
  (b) a floor support piece having a linear rod portion adapted to be inserted into said outer tension band;
  (c) a U-shaped rod having a linear rod portion adapted to be inserted into said outer tension band; and
  (d) a shelf extension having a linear rod portion adapted to be inserted into said outer tension band.

* * * * *

UNITED STATES PATENT AND TRADEMARK OFFICE
CERTIFICATE OF CORRECTION

PATENT NO. : 5,692,624
DATED : December 2, 1997
INVENTOR(S) : Luther P. McKinney It is certified that error appears in the above-indentified patent and that said Letters Patent is hereby corrected as shown below:

Column 3, line 27, correct "table or bench" to read --cart--.

Column 4, line 33, after "surface" insert --40--.

Column 8, line 35, correct "tension" to read --extension--.

Column 8, line 36, correct "extension" to read --tension --.

Column 9, line 48, insert --components-- after "the".

Column 9, line 54, correct "(e)" to read --(c)--.

Signed and Sealed this

Tenth Day of March, 1998

BRUCE LEHMAN

*Attest:*

*Attesting Officer*      *Commissioner of Patents and Trademarks*